United States Patent
Perry

(10) Patent No.: US 10,490,871 B2
(45) Date of Patent: Nov. 26, 2019

(54) REDOX-AIR INDIRECT FUEL CELL

(71) Applicant: United Technologies Corporation, Farmington, CT (US)

(72) Inventor: Michael L. Perry, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 17 days.

(21) Appl. No.: 15/564,261

(22) PCT Filed: Apr. 8, 2015

(86) PCT No.: PCT/US2015/024870
§ 371 (c)(1),
(2) Date: Oct. 4, 2017

(87) PCT Pub. No.: WO2016/164008
PCT Pub. Date: Oct. 13, 2016

(65) Prior Publication Data
US 2018/0138567 A1    May 17, 2018

(51) Int. Cl.
*H01M 12/08* (2006.01)
*H01M 4/90* (2006.01)
(Continued)

(52) U.S. Cl.
CPC ............. *H01M 12/08* (2013.01); *H01M 4/20* (2013.01); *H01M 4/9041* (2013.01); *H01M 4/9075* (2013.01); *H01M 4/92* (2013.01); *H01M 8/04089* (2013.01); *H01M 8/04201* (2013.01); *H01M 8/188* (2013.01); *H01M 2300/0025* (2013.01)

(58) Field of Classification Search
CPC .... H01M 4/90; H01M 4/9041; H01M 4/9075; H01M 4/92; H01M 8/04082; H01M 8/04021; H01M 8/04089; H01M 8/18; H01M 8/188; H01M 12/08
See application file for complete search history.

(56) References Cited

U.S. PATENT DOCUMENTS

| | | |
|---|---|---|
| 5,318,865 A | 6/1994 | Kaneko et al. |
| 5,429,886 A | 6/1995 | Struthers |

(Continued)

FOREIGN PATENT DOCUMENTS

| | | | |
|---|---|---|---|
| WO | 2013006029 | 1/2013 | |
| WO | WO-2013006029 A1 * | 1/2013 | ............... C25B 1/04 |

OTHER PUBLICATIONS

Hosseiny, S.S. et al., A polyelectrolyte membrane-based vanadium/air redox flow battery, 2011, Electrochemistry Communications. Aug. 2011. vol. 13, No. 8; pp. 751-754. (Year: 2011).*

(Continued)

*Primary Examiner* — Karie O'Neill Apicella
(74) *Attorney, Agent, or Firm* — Carlson, Gaskey & Olds, P.C.

(57) ABSTRACT

An electrochemical device includes first and second spaced-apart electrodes. The first electrode is configured for redox reactions with a liquid electrolyte solution and the second electrode is configured for redox reactions with each of a gaseous reductant and a gaseous oxidant. An electrolyte separator is arranged between the electrodes.

20 Claims, 1 Drawing Sheet

(51) Int. Cl.
  *H01M 4/92*  (2006.01)
  *H01M 8/04089*  (2016.01)
  *H01M 8/04082*  (2016.01)
  *H01M 8/18*  (2006.01)
  *H01M 4/20*  (2006.01)

(56) References Cited

U.S. PATENT DOCUMENTS

| | | | |
|---|---|---|---|
| 6,511,767 B1 * | 1/2003 | Calver | H01M 4/96 |
| | | | 429/505 |
| 6,649,300 B2 * | 11/2003 | Ito | H01M 4/92 |
| | | | 204/282 |
| 2010/0196800 A1 | 8/2010 | Markoski et al. | |
| 2011/0249373 A1 * | 10/2011 | Farahmandi | H01G 11/02 |
| | | | 361/502 |
| 2011/0293482 A1 * | 12/2011 | Wootton | B01J 3/008 |
| | | | 422/110 |
| 2013/0216923 A1 | 8/2013 | Hosseiny et al. | |

OTHER PUBLICATIONS

International Preliminary Report on Patentability for PCT/US2015/024870 dated Nov. 13, 2017.

Hosseiny, S. S. (2011). A polyelectrolyte membrane-based vanadium/air redox flow battery. Electrochemistry Communications. Aug. 2011. vol. 13, No. 8; pp. 751-754.

International Search Report and Written Opinion for International Application No. PCT/US2015/024870 completed Jul. 24, 2015.

\* cited by examiner

CHARGING USING OXIDIZED
OR PARTIALLY OXIDIZED LIQUID
ELECTROLYTE SOLUTION AND
GASEOUS REDUCTANT

↕

DISCHARGING USING REDUCED
LIQUID ELECTROLYTE SOLUTION
AND GASEOUS OXIDANT

REDOX-AIR INDIRECT FUEL CELL

BACKGROUND

Fuel cells generate an electric current in an electrochemical reaction between gaseous reactants, such as hydrogen and air. Fuel cells are different from other electrochemical devices, such as batteries, because fuel cells utilize active species that are stored external to the cells and these reactants are typically gas-phase reactants. In contrast, a traditional battery utilizes chemical energy in internally-stored active species in electrodes and electrolytes to generate electric current and the active species are typically either solids and/or liquids. The electrochemical reaction in some batteries can be reversed by applying an electric current, to recharge the battery.

One variation of a traditional battery is a flow battery, also known as a redox flow battery or redox flow cell. Unlike a traditional battery that has internally-stored active species, a flow battery utilizes externally-stored active species to generate electric current. The active species are typically dissolved in liquid electrolyte solutions. For example, the electrolyte solutions are circulated through the flow battery cells from external storage vessels. The active species are typically simple redox couples, such that the electrochemical reactions are reversible so that the flow battery can be recharged.

Another variation of a traditional battery is known as a metal-air battery, in which one electrode is a metal and the other electrode is air. Most metal-air batteries are not rechargeable. Rechargeable metal-air batteries require electrical reversal of the electrochemical reaction at a bi-functional air cathode catalyst, but such a catalyst is inefficient and the charging voltage is thus much higher than the discharging voltage, resulting in very low cycle efficiency, as well as the use of more expensive materials that do not corrode at high electrochemical potentials.

SUMMARY

An electrochemical device according to an example of the present disclosure includes first and second spaced-apart electrodes. The first electrode is configured for redox reactions with a liquid electrolyte solution and the second electrode configured for redox reactions with each of a gaseous reductant and a gaseous oxidant. An electrolyte separator is arranged between the electrodes.

In a further embodiment of any of the foregoing embodiments, at least one of the first and second electrodes includes a metal-electrocatalyst.

In a further embodiment of any of the foregoing embodiments, the second electrode includes a metal-electrocatalyst and the first electrode excludes any metal-electrocatalyst.

In a further embodiment of any of the foregoing embodiments, the metal-electrocatalyst includes at least one metal catalyst on a support.

In a further embodiment of any of the foregoing embodiments, the at least one metal catalyst is selected from the group consisting of platinum-group metals, transition metals, and combinations thereof.

In a further embodiment of any of the foregoing embodiments, the metal-electrocatalyst has 10 to 50% by weight of the least one metal catalyst.

A further embodiment of any of the foregoing embodiments includes an external supply/storage system including a vessel fluidly connected in a recirculation loop with the first electrode.

A further embodiment of any of the foregoing embodiments includes a gas supply system configured to provide the gaseous reductant and the gaseous oxidant to the second electrode, and the gas supply system is an open-loop.

In a further embodiment of any of the foregoing embodiments, the gaseous reductant is a hydrogen-containing gas.

In a further embodiment of any of the foregoing embodiments, the gaseous oxidant is an oxygen-containing gas.

In a further embodiment of any of the foregoing embodiments, the liquid electrolyte solution is a transition metal-based electrolyte solution.

In a further embodiment of any of the foregoing embodiments, the liquid electrolyte solution is an organic-based solution.

In a further embodiment of any of the foregoing embodiments, the liquid electrolyte solution is an alcohol/ketone-based or an alcohol/aldehyde-based solution.

A method for a rechargeable electrochemical device according to an example of the present disclosure includes (a) charging an electrochemical device by feeding a liquid electrolyte solution into a first half-cell of the electrochemical device and feeding a gaseous reductant into a second half-cell of the electrochemical device to electrochemically reduce at least a portion of the liquid electrolyte solution in the electrochemical device, and (b) discharging the electrochemical device to provide electrical power output by feeding the reduced liquid electrolyte solution into a first half-cell of the electrochemical device and feeding a gaseous oxidant into a second half-cell of the electrochemical device to electrochemically oxidize at least a portion of the liquid electrolyte solution in the electrochemical device.

In a further embodiment of any of the foregoing embodiments, the liquid electrolyte solution is a transition metal-based electrolyte solution.

In a further embodiment of any of the foregoing embodiments, the liquid electrolyte solution is an organic-based redox solution.

A further embodiment of any of the foregoing embodiments includes electrolyzing water in-line with the electrochemical cell to feed hydrogen (H2) as the gaseous reductant in said step (a).

A further embodiment of any of the foregoing embodiments includes feeding a hydrogen-containing stream derived from the reforming of a hydrocarbon as the gaseous reductant in said step (a).

In a further embodiment of any of the foregoing embodiments, the hydrocarbon includes methane.

A further embodiment of any of the foregoing embodiments includes accelerating the charging by applying an electric current to the electrochemical cell during said step (a).

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figures 1, 2:
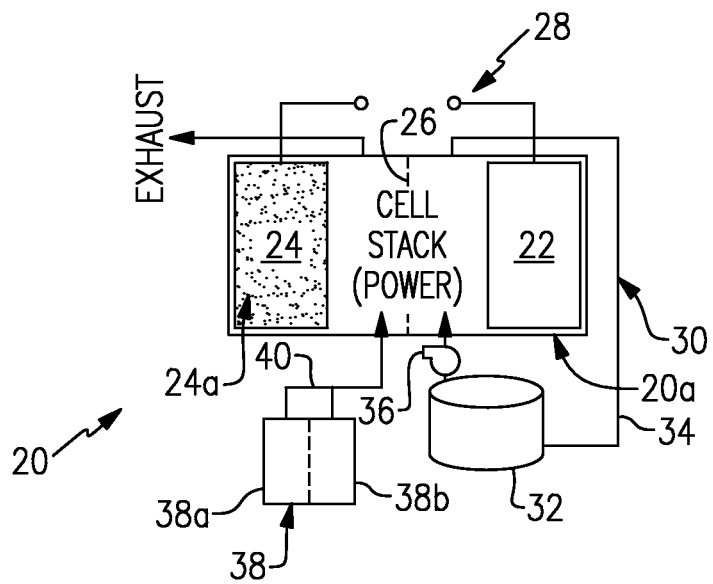
FIG. 1 illustrates an example electrochemical device that has one electrode configured for redox reactions with a liquid electrolyte solution and another electrode configured for redox reactions with each of a gaseous reductant and a gaseous oxidant.
FIG. 2 illustrates an example method for a rechargeable electrochemical device.

FIG. 1 illustrates an example rechargeable electrochemical device 20. As will be appreciated from this disclosure, the device 20 is somewhat of a hybrid. The device 20 utilizes externally-supplied gaseous reactants, similar to a fuel cell, and a liquid electrolyte, similar to a flow battery. This enables the device 20 to offer functionality that cannot be obtained from a fuel cell or battery alone.

The device 20 includes at least one electrochemical cell 20a. A plurality of such electrochemical cells 20a can be provided in a stack or other configuration. Each cell 20a includes first and second spaced-apart electrodes 22/24 and an electrolyte separator 26 arranged between the electrodes 22/24. For example, the separator 26 can be a polymer electrolyte membrane. The electrodes 22/24 are connected to an electric circuit 28.

The first electrode 22 is configured for redox reactions with a liquid electrolyte solution, such as but not limited to, solutions that are used in flow batteries. An example solution is a vanadium-based electrolyte solution for a flow battery. The second electrode 24 is configured for redox reactions with each of a gaseous reductant and a gaseous oxidant.

The electrodes 22/24 are porous to accommodate the flow of the liquid or gas reactants and are electrically conductive. The electrodes 22/24 may also contain electrocatalysts to promote the desired electrochemical reactions on each electrode. For example, the second electrode 24 preferably includes a metal-electrocatalyst 24a and the first electrode 22 preferably excludes any metal-electrocatalyst. The metal-electrocatalyst 24a can be a noble metal such as, but not limited to, platinum and alloys of platinum. Alternative electrocatalysts may be utilized, including transition-metal based catalysts or even non-metallic catalysts (e.g., nitrogen-doped carbons or organic polymers), but these electrocatalysts to date have demonstrated relatively poor stability as well as activities that are substantially less than noble-metal based catalysts, especially for the oxygen-reduction reaction. In further examples, the noble metal catalyst can be selected to be active for the target gaseous reductants and gaseous oxidants that are to be used, such as hydrogen and oxygen (as air or pure oxygen), respectively. In the case of hydrogen and oxygen, the electrocatalyst 24a only needs to be active for the hydrogen-oxidation reaction and the oxygen-reduction reaction; it does not need to be active for the reverse reactions (e.g., the oxygen-evolution reaction) as is the case in a "reversible" air electrode. In a further example, the metal-electrocatalyst 24a can be a supported metal-electrocatalyst such as, but not limited to, noble metals deposited and supported on support particles. The support particles should have high surface areas and be electrically conductive, such as carbon powders. For instance, the supported electrocatalyst has 10 to 50% by weight of the metal.

The first electrode 22 can be a carbon electrode (without any noble metal catalyst). An example carbon electrode is a porous carbon structure, such as carbon paper or felt. The surfaces of the carbon structure can be active with regard to the electrochemically active species of the liquid electrolyte solution. In the redox reactions involving vanadium electrolyte solution, for example, the energy barrier to the electrochemical reactions are relatively low, and thus a metal-electrocatalyst material is not required. In one further example, the carbon is activated using a prior thermal and/or chemical treatment process to clean and condition the carbon material and produce carbon-oxide surfaces that serve as active electrochemical sites. In the case where the redox reactants have a higher energy barrier to the electrochemical reaction than a conventional redox couple, then the first electrode 22 may also include catalyst materials beyond carbon, including metals or even noble metals such as platinum or platinum alloys. The catalysts can be selected to be active for the target redox reactants that are to be used, such as organic-based reactants as described below.

The device 20 also includes an external supply/storage system 30. That is, the system 30 is external of the cell or cells 20a. The system 30 includes at least one vessel 32 fluidly connected in a recirculation loop 34 with the first electrode 22. The vessel 32 can hold the liquid electrolyte solution for recirculation through the first electrode 22 during operation of the device 20. The recirculation loop 34 may also include one or more pumps 36 to facilitate the recirculation of the liquid electrolyte solution through the loop 34, vessel 32, and first electrode 22.

The device 20 can also include a gaseous reactant supply system 38 that is operable to provide gaseous reactants to the second electrode 24 in an open loop. That is, once used in the cell or cells 20a, the reactant and/or byproduct is exhausted rather than recirculated through the cell or cells 20a. A gaseous oxidant can be an oxygen-containing gas, such as air. A gaseous reductant can be a hydrogen-containing gas, such as natural gas reformate, for example.

The gaseous reactant supply system 38 can include one or more gas sources (two shown, at 38a and 38b). For example, at least one of the gas sources can be a pressurized gas tank. Additionally or alternatively, at least one of the gas sources can be an electrolyzer, for water electrolysis and in-line feeding of hydrogen to the second electrode 24 as a gaseous reductant. The electrolyzer can be operated in an on-demand basis to provide gaseous reductant. In further examples, in the case of oxygen as an oxidizing gaseous reactant source, air can be provided by using an air blower (or compressor) or, alternatively, the electrolyzer can be used to provide a pure oxygen stream on-demand. A valve 40 can be provided to control the feed of gas, with respect to which gaseous reactant and the flow rate. For example, a controller having software, hardware, or both may be used to control the valve 40 and gas flow in response to the state of the device 20 (either charging or discharging).

A gaseous oxidant is used during discharge of the device 20 to supply an electric current from the circuit 28, and a gaseous reductant is used during charging to store electric current as chemical energy. When recharging on reformate, the device 20 can be operated at an elevated temperature, such as 100-140° C., to enhance carbon monoxide tolerance.

As depicted in an example method in FIG. 2, the device 20 can be charged by feeding an oxidized or partially oxidized liquid electrolyte solution into a first half-cell (first electrode 22) of the device 20 and feeding a gaseous reductant into a second half-cell (second electrode 24) to electrochemically reduce at least a portion of the liquid electrolyte. For example, the device 20 is charged by providing the gaseous reductant to the second electrode 24 while circulating the liquid electrolyte solution through the first electrode 22. At least for vanadium, there is a relatively low energy barrier and the reactions are thus spontaneous. However, the reduction using hydrogen or other gaseous reductant can be accelerated by applying an electric current to the electric circuit 28 during the charging. The power and energy ratings of the device 20 are independent, where the stack size determines maximum power and the vessel size determines the maximum energy.

The device 20 can be discharged to provide electrical power output by feeding the reduced liquid electrolyte solution into the first half-cell and feeding a gaseous oxidant into the second half-cell to electrochemically oxidize at least a portion of the liquid electrolyte solution in the electrochemical device. For example, the device 20 is discharged by providing the gaseous oxidant, such as air or other oxygen-containing gas, to the second electrode 24 while circulating the liquid electrolyte solution through the first electrode 22. Electrical energy is generated by these electrochemical reactions during discharge in the form of a voltage and an electrical current in the circuit 28. Further examples of the method are embodied in the device 20, as described herein.

The half-cell reactions and potentials for discharge and charge in an example where the liquid electrolyte solution contains vanadium ($V^{2+}/V^{3+}$) are as follows:

Discharge (Gaseous Oxidant)
$2VSO_4 + H_2SO_4 \rightarrow V_2(SO_4)_3 + 2H^+ + 2e^-$
E=−0.255 V (RHE)
$½O_2 + 2H^+ + 2e^- \rightarrow H_2O$
E=+1.23 V (RHE)
Overall $2VSO_4 + ½O_2 + H_2SO_4 \rightarrow V_2(SO_4)_3 + H_2O$
$E_{overall}$=1.485 V
Charge (Gaseous Reductant)
$V_2(SO_4)_3 + 2H^+ + 2e^- \rightarrow 2VSO_4 + H_2SO_4$
E=−0.255 V (RHE)
$H_2 \rightarrow 2H^+ + 2e^-$
E=0.0 V (RHE)
Overall $V_2(SO_4)_3 + H_2 \rightarrow 2VSO_4 + H_2SO_4$
$E_{overall}$=0.255 V The liquid electrolyte solution may include ions of elements that have multiple, reversible oxidation states in a selected liquid solution, such as but not limited to, aqueous solutions or dilute aqueous acids, such as 1-5M sulfuric acid. The solutions could alternatively be based on non-aqueous electrolytes or solvents to enable higher cell potentials than can be tolerated with aqueous solutions. In some examples, the multiple oxidation states are non-zero oxidation states, such as for transition metals including but not limited to vanadium, iron, manganese, chromium, zinc, molybdenum and combinations thereof, and other elements including but not limited to sulfur, cerium, lead, tin, titanium, germanium and combinations thereof. In some examples, the multiple oxidation states can include the zero oxidation state if the element is readily soluble in the selected liquid solution in the zero oxidation state. Such elements can include the halogens, such as bromine, chlorine, and combinations thereof.

The electrochemically active species could also be organic molecules that contain groups that undergo electrochemically reversible reactions, such as quinones and hydroquinones, or the electrochemical hydrogenation and dehydrogenation of liquid-phase organics such as alcohols and ketones, which may be mixed with a liquid electrolyte such as sulfuric acid or may be present in an ionically-neutral aqueous or non-aqueous solutions. In the case of neutral solutions, such as alcohols and ketones, these may be used as pure solutions or may be diluted with water and the dilution level may vary during the operation due to the generation of water as well as the loss of water to the environment via the gas exhaust. The half-cell reactions and potentials for discharge and charge in an example based on a liquid-phase organic, in this case the partial dehydrogenation of 2-propanol to acetone, are as follows:

Discharge (Gaseous Oxidant)
$C_3H_8O \rightarrow C_3H_6O + 2H^+ + 2e^-$
E=+0.15 V (RHE)
$½O_2 + 2H^+ + 2e^- \rightarrow H_2O$
E=+1.23 V (RHE)
Overall $C_3H_8O + ½O_2 \rightarrow C_3H_6O + H_2O$
$E_{overall}$=+1.08 V
Charge (Gaseous Reductant)
$C_3H_6O + 2H^+ + 2e^- \rightarrow C_3H_8O$
E=+0.15 V (RHE)
$H_2 \rightarrow 2H^+ + 2e^-$
E=0.0 V (RHE)
Overall $C_3H_6O + H_2 \rightarrow C_3H_8O$
$E_{overall}$=−0.15 V The device 20 may facilitate a relatively rapid recharge and be used for many power applications. In one non-limiting example, the device 20 can be used for back-up power (e.g., telecom cell towers). The device 20 can also be used in electric vehicles, if the negative electrochemically active species has a sufficiently high energy density to be compelling for a transportation application. An example of such a rechargeable "fuel" would be the electrochemical dehydrogenation of 2-propanol ($C_3H_8O$) to acetone ($C_3H_6O$), with the reverse reaction being the hydrogenation of the ketone (acetone) back to the corresponding alcohol (2-propanol), as shown above. The electrochemical dehydrogenation and hydrogenation of many other alcohol and ketone couples could be used as well, such as other secondary alcohols or higher molecular weight primary alcohols (e.g., geraniol). In fact, any organic molecules that is a liquid in the desired operating temperature range and can undergo dehydrogenation and hydrogenation may potentially be utilized. The device 20 also can provide multiple-hour run time, with no hydrogen storage, and can be recharged indirectly with natural gas via a reformer to provide a source of hydrogen. Therefore, the vehicle can be charged anywhere there is a natural gas pipeline and electricity to power the refueling equipment. The electricity may also be used to help charge the device, if required because the charging reaction has an overall potential <0 (as is the case with the 2-propanol/acetone example), or if one wishes to accelerate the charging process. In a vehicle application, the gaseous reductant does not need to be carried onboard, since it is only needed for recharging. Therefore, the source of the gaseous reductant can be a separate system.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:
1. An electrochemical device comprising:
first and second spaced-apart electrodes, the first electrode configured for redox reactions with a liquid electrolyte solution and the second electrode configured for redox reactions with each of a gaseous reductant and a gaseous oxidant, wherein the second electrode includes a metal-electrocatalyst and the first electrode excludes any metal-electrocatalyst; and an electrolyte separator arranged between the electrodes.

2. The electrochemical device as recited in claim 1, wherein the metal-electrocatalyst includes at least one metal catalyst on a support.

3. The electrochemical device as recited in claim 2, wherein the at least one metal catalyst is selected from the group consisting of platinum-group metals, transition metals, and combinations thereof.

4. The electrochemical device as recited in claim 3, wherein the metal-electrocatalyst has 10 to 50% by weight of the least one metal catalyst.

5. The electrochemical device as recited in claim 1, further comprising an external supply/storage system including a vessel fluidly connected in a recirculation loop with the first electrode.

6. The electrochemical device as recited in claim 5, further comprising a gas supply system configured to provide the gaseous reductant and the gaseous oxidant to the second electrode, and the gas supply system is an open-loop.

7. The electrochemical device as recited in claim 1, wherein the gaseous reductant is a hydrogen-containing gas.

8. The electrochemical device as recited in claim 1, wherein the gaseous oxidant is an oxygen-containing gas.

9. The electrochemical device as recited in claim 1, wherein the liquid electrolyte solution is a transition metal-based electrolyte solution.

10. The electrochemical device as recited in claim 1, wherein the liquid electrolyte solution is an organic-based solution.

11. The electrochemical device as recited in claim 1, wherein the liquid electrolyte solution is an alcohol/ketone-based or an alcohol/aldehyde-based solution.

12. A method for a rechargeable electrochemical device, comprising:
(a) charging an electrochemical device by feeding a liquid electrolyte solution into a first half-cell of the electrochemical device and feeding a gaseous reductant into a second half-cell of the electrochemical device to electrochemically reduce at least a portion of the liquid electrolyte solution in the electrochemical device, the first half-cell including a first electrode configured for redox reactions with the liquid electrolyte solution and the second half-cell having a second electrode configured for redox reactions with the gaseous reductant, wherein the second electrode includes a metal-electrocatalyst and the first electrode excludes any metal-electrocatalyst; and
(b) discharging the electrochemical device to provide electrical power output by feeding the reduced liquid electrolyte solution into a first half-cell of the electrochemical device and feeding a gaseous oxidant into a second half-cell of the electrochemical device to electrochemically oxidize at least a portion of the liquid electrolyte solution in the electrochemical device.

13. The method as recited in claim 12, wherein the liquid electrolyte solution is a transition metal-based electrolyte solution.

14. The method as recited in claim 12, wherein the liquid electrolyte solution is an organic-based redox solution.

15. The method as recited in claim 12, further comprising electrolyzing water in-line with the electrochemical cell to feed hydrogen ($H_2$) as the gaseous reductant in said step (a).

16. The method as recited in claim 12, further comprising feeding a hydrogen-containing stream derived from the reforming of a hydrocarbon as the gaseous reductant in said step (a).

17. The method as recited in claim 16, wherein the hydrocarbon includes methane.

18. The method as recited in claim 12, further comprising accelerating the charging by applying an electric current to the electrochemical cell during said step (a).

19. The electrochemical device as recited in claim 1, wherein the first electrode is a carbon electrode.

20. The electrochemical device as recited in claim 1, wherein the first and second electrodes are porous.

\* \* \* \* \*